United States Patent [19]
Hussmann

[11] 4,296,742
[45] Oct. 27, 1981

[54] FLAT SOLAR ENERGY COLLECTOR WITH LOW HEAT CONTACT BETWEEN ABSORBER AND EDGE OF COLLECTOR

[75] Inventor: Eckart Hussmann, Ober-Olm, Fed. Rep. of Germany

[73] Assignee: JENAer Glaswerk Schott & Gen., Fed. Rep. of Germany

[21] Appl. No.: 913,189

[22] Filed: Jun. 6, 1978

[30] Foreign Application Priority Data

Jun. 7, 1977 [DE] Fed. Rep. of Germany ....... 2725633

[51] Int. Cl.³ .................................................. F24J 3/02
[52] U.S. Cl. ..................................... 126/450; 126/444
[58] Field of Search ............... 126/270, 271, 450, 444, 126/445; 237/1 A; 165/135, 136, 170, 171

[56] References Cited

U.S. PATENT DOCUMENTS

| | | | |
|---|---|---|---|
| 2,705,948 | 4/1955 | Rostock | 126/271 |
| 2,819,884 | 1/1958 | Rieppel et al. | 165/170 |
| 4,003,363 | 1/1977 | Grossman | 126/450 |
| 4,048,981 | 9/1977 | Hubb | 126/448 |
| 4,069,811 | 1/1978 | Tabor | 126/271 |
| 4,084,580 | 4/1978 | Roark | 126/450 |

FOREIGN PATENT DOCUMENTS

| | | | |
|---|---|---|---|
| 2510047 | 9/1976 | Fed. Rep. of Germany | 237/1 A |
| 938012 | 9/1963 | United Kingdom | 126/271 |

*Primary Examiner*—James C. Yeung
*Attorney, Agent, or Firm*—Schwartz & Weinrieb

[57] ABSTRACT

The present invention relates to a flat, gas-tight solar energy collector having a novel absorber means consisting of an absorber plate and an edge connecting means attached thereto for connecting the absorber to the edge structure of the collector. No direct thermal contact exists between the edge of the absorber plate and the edge structure means. Thus, heat losses on the sides of the collector are kept to a minimum.

9 Claims, 4 Drawing Figures

FLAT SOLAR ENERGY COLLECTOR WITH LOW HEAT CONTACT BETWEEN ABSORBER AND EDGE OF COLLECTOR

BACKGROUND OF THE INVENTION

The invention relates to a flat solar energy collector which converts solar radiation into heat.

Flat-plate solar energy collectors are well known in the art for the conversion of solar radiation into heat. These collectors consist of an absorber, heat insulation on the back side of the absorber, a covering above the absorber which is transparent for the incoming solar radiation, and a box-type or frame construction which connects the parts. The absorber is generally a metallic surface which is in close contact with a pipe or tube system through which a heat transfer medium flows, transporting the radiant energy that has been converted into heat to the user. The absorber is usually blackened on the side which faces the sun so as to provide maximum efficiency in absorbing solar energy for heating a heat absorbing or transfer medium passing through the pipe or tube system. It is here that the radiation is converted into heat.

The absorber, heated by solar radiation, not only transmits the heat to the heat transfer medium but also loses heat to surrounding areas and steps have been taken in the past to reduce these losses, which occur particularly by convection and conduction. For example, the side of the collector opposite to the incident solar radiation can be protected against heat losses in a simple way. Conventional insulating materials, e.g., glass wool asbestos or styrofoam, in appropriate strength, can be placed on the back side of the absorber thereby providing good heat insulation at low costs.

It is more difficult to protect the side of the absorber exposed to solar radiation against heat losses. Thermal insulating devices installed on the side of the absorber are required, as far as possible, to permit the radiation to pass through these thermal insulating devices without hindrance, i.e. they must be substantially transparent for solar radiation. Therefore glass panes, plastic panes or plastic sheeting is used as a covering.

In addition to heat losses occurring at the back of the absorber and through the transparent covering, heat losses also occur over the edge. A solar collector with a high efficiency is therefore characterized by the fact that a large part of the incident solar radiation reaches the absorber through the transparent covering, and is absorbed, as far as possible, and converted into heat which is mostly usable heat whereas the heat losses via front and back as well as via the edge are small.

In addition to the aforementioned radiation, physical and heat transfer requirements, a good solar energy collector should also have other qualities. Significantly, its working life should be long. The materials being used must be selected so that they can withstand thermal stresses and be resistant to corrosion. A particularly critical point is the nature of the space between the absorber and transparent covering. If the collector heats up when exposed to solar radiation, then the temperature will rise within this space thereby causing the air within this space to expand with the resultant flow of the air towards the outside until a pressure equalization is achieved with the atmosphere, unless this space is completely gas-tight with respect to the outside. After the air within said space cools, air then flows from outside to inside. One could also say that "the collector breathes". Thus, dangerous water condensation can develop within the space between the absorber and the transparent covering. Condensed water not only reduces the efficiency of the collector but it is also corrosive to the blackening of the absorber, the absorber sheeting, the sealing compounds, etc.

It is possible to avoid the formation of condensed water by airing the space between the absorber and the transparent covering. However, in the long run, this will create dust and dirt on the parts adjoining this space, i.e. the transparent covering and the absorber thereby reducing the efficiency of the device. Another method is to seal the space against gas exchange between the absorber and the transparent covering with respect to the outside. This task proves to be difficult since all organic plastics allow water vapor to diffuse to a more or less high degree. Adhesion surface areas should be thin and wide.

In principle, there are, so far, two possible methods for obtaining a gas-tight, and significantly, a water vapor-tight seal for the space between the absorber and the transparent covering, which include:

1. The metallic absorber is glued over bars, or spacing member 5 (preferably metallic) to the transparent covering 1 (usually glass panes), as illustrated in FIG. 1; and 2. The absorber is placed within a case defined by walls 2 and 8 which is connected with the transparent covering 1 is a gas-tight manner. The case is generally made of a metal (see FIG. 2).

The aforementioned types of construction have disadvantages. In the first method (see FIG. 1), the thermal contact between the hot absorber and the edge structure is very high, therefore resulting in significant heat losses from the edge of the absorber plate. In the second method (see FIG. 2), the absorber is well-insulated thermally, from the edge structure, but it is difficult to conduct the inflow and outflow of the heat transfer medium through the wall or the bottom of the base. This should be done in such a manner wherein only an insignificant heat transfer results from the inflow and outflow ducts to the metallic case, while at the same time maintaining a gas-tight seal. Such constructions are, therefore, expensive to produce.

Another disadvantage is the great volume of gas present particularly when open, porous insulating materials, e.g., glass wool, are used.

When the air space in the solar collector heats up under the influence of solar radiation, the developing air pressure can only be minimally reduced by pushing out the bottom of the case and the glass covering towards the outside. This increase in volume is too low with respect to the great initial volume of the air space. The arrangement according to FIG. 1, is definitely more advantageous. Arching of the covering and the absorber decreases the pressure because there is a great change in volume—relative to the initial volume.

OBJECTS OF THE INVENTION

It is therefore a significant object of the present invention to simultaneously combine the advantages of the simple construction principle of a solar collector according to FIG. 1 with the advantages of the low heat-transfer between absorber and edge structure of a collector according to FIG. 2; in order to keep heat losses towards the edge of the collector at a minimum. Consistent with this object of the invention is the provision of a simple connection means with the edge, thereby assuring a gas-tight seal of the space existing between absorber and transparent covering.

BRIEF SUMMARY OF THE INVENTION

Briefly, the present invention is a gas-tight solar collector unit for converting solar radiation into heat. The collector comprises a solar energy absorber plate and a cover means which is transparent to solar energy and overlies the absorber. An edge structure means is provided for maintaining the absorber plate and cover means in a spaced relation thereby providing an airspace therebetween. A further means is provided for connecting the absorber to the edge structure means so that no direct thermal contact exists between the edge of the absorber and the edge structure means.

DETAILED DESCRIPTION OF THE INVENTION

Figure 1:
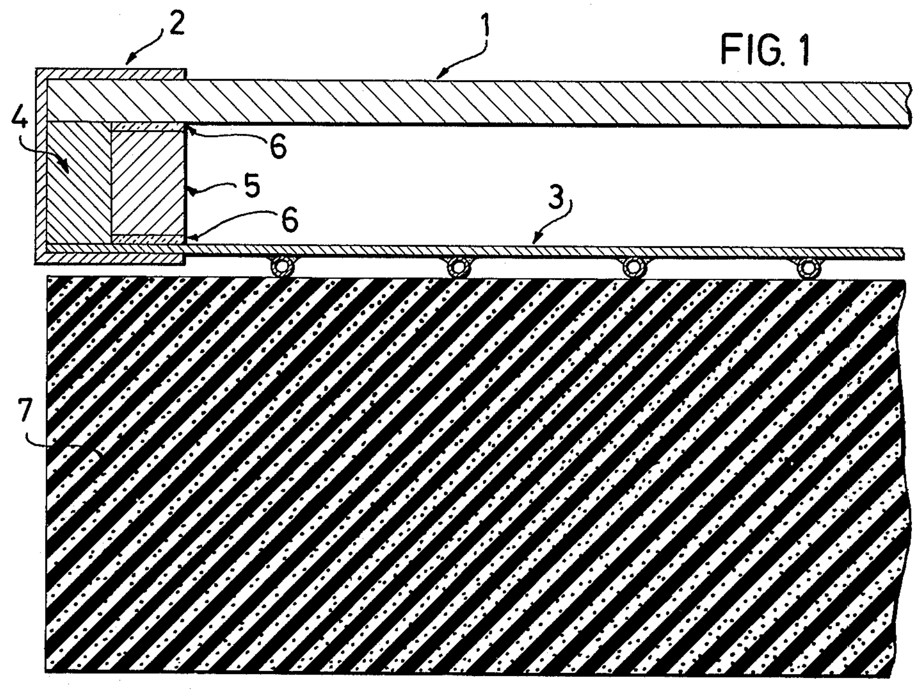
FIG. 1 illustrates a prior art device wherein a metallic absorber is glued over bars to the transparent covering.
Figure 2:
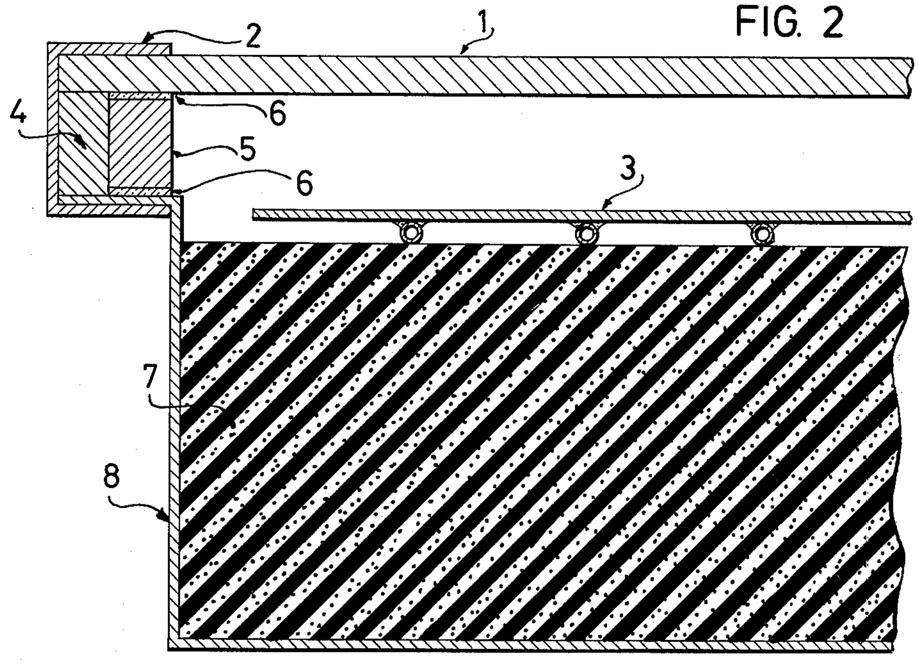
FIG. 2 illustrates another prior art device wherein the absorber is placed within a box with the transparent covering rendering the space between the covering and absorber gas-tight.
Figure 3:
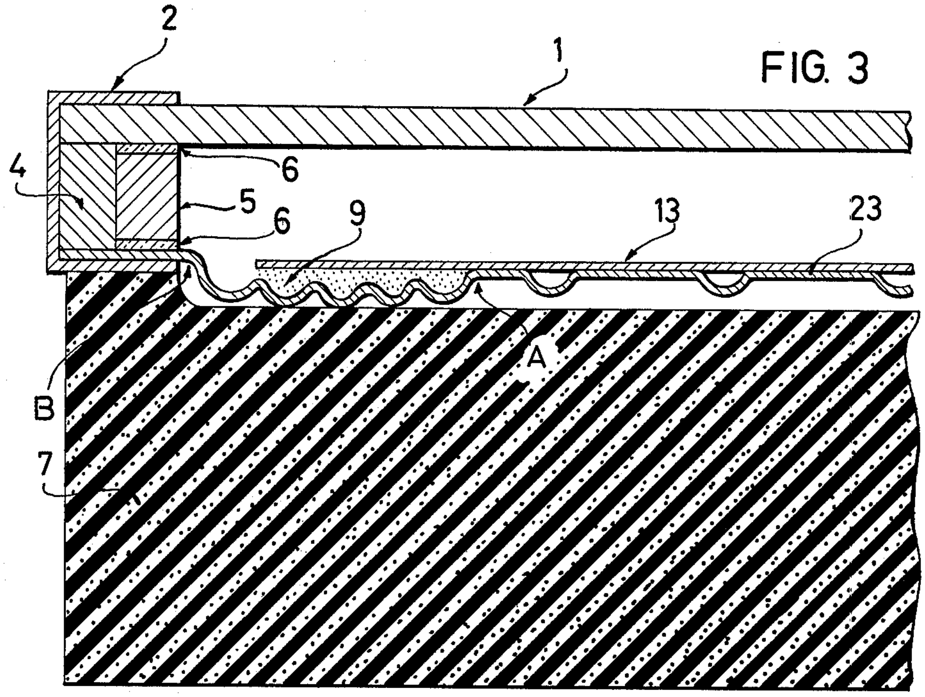
FIG. 3 is an illustration of one embodiment of the present invention.

Referring to FIG. 3, a solar heat collector is illustrated having a frame 2 in combination with an outer cover plate 1, and an solar energy absorber means defined by absorber plate 13 and an edge connecting means or sheet 23. An edge structure means is illustrated for maintaining the absorber plate 13 and cover means 1 in a spaced relation to provide an airspace therebetween.

As noted above, the absorber means preferably consists of two separate plates or sheets that are secured together by conventional means, e.g., welding. One plate 13 is used to absorb the solar energy and the other sheet functions as an edge connecting means with the edge structure means. The edge connecting means, which is secured to the side of the absorber plate 13 opposite the incident radiation, is connected to the edge structure means by being glued or otherwise adhered over an aluminum spacing member 5 to said cover means 1.

The edge connecting means or sheet 23 preferably consists of a metal exhibiting a low thermal conductivity, e.g., stainless steel, which, when compared to aluminum, has a thermal conductivity of about one-tenth that of aluminum. Sheet 23 should be as thin as possible, and generally between about 0.1 and 1.5 mm and preferably between 0.3 and 0.6 mm, in order to prevent the loss of heat towards the edge thereof. It is desired that the edge connecting means have a thermal conductivity value below about 50 w/mk.

The edge connecting means or sheet 23 is preferably welded to absorber plate 13 although sheet 23 and plate 13 can be secured by other means provided that an air-tight joint is achieved. As noted hereinbefore, both sheet 23 and plate 13 form the absorber means of this invention. The absorber means is provided with a channel or conduit system which is defined by sheets 13 and 23, said channel or conduit system preferably providing a network of parallel flow passages for a heat transfer medium from one end of the absorber plate to the other end thereof.

At a point A on the absorber plate 13 which is located in close proximity to the outermost channel or flow passage, and which is about 5 to 10 cm. from the edge of said absorber plate 13, edge connecting sheet 23 extends away from, and downwards from said absorber plate 13 and towards the edge structure means. This portion of the edge connecting means 23 preferably has a wave-like or corrugated shape which extends between the outermost channel or conduit and the edge of absorber plate 13. The edge connecting sheet 23 is bent upwards, projecting away from, out and over the edge of the upper absorber plate 13 and is connected to the covering means 1, by means of the edge structure means which consists of the spacing member or bar 5 and glass panes 6.

The edge connecting means or sheet 23 should be as thin as possible and generally between about 0.1 and 1.5 mm and preferably between 0.3 and 0.6 mm in order to prevent the loss of heat towards the edge thereof. The wave-like or corrugated shape of edge connecting means or sheet 23 prolongs the distance in which the heat flows or travels from the absorber plate 13 to the edge of said edge connecting means or sheet 23 thereby resulting in a diminished flow of heat. Thus, the heat losses from the absorber plate 13 to the edge structure means are minimized.

In the space defined between absorber plate 13 and edge connecting means or sheet 23, a conventional heat-insulating material 9, e.g., glass wool, is inserted therein in order to prevent the transfer of heat between absorber plate 13 and sheet 23.

The airspace between the upper sheet 13 and the spacing member 5 should be between about 1 to 2 cm. so that only a small amount of heat is transmitted thereto.

It is understood that the solar radiation absorber plate or sheet 13 or 33 (FIG. 4), is made of a heat conducting material such as aluminum, steel, copper, tin, and alloys thereof.

A further advantage of the connecting means for connecting the absorber means and structure means according to the present invention is that the wave-like construction of the lower sheet 23 reduces the stresses and tensions transmitted to the edge structure means which results from the different thermal expansions of the absorber plate and the glass covering upon heating. Similarly, the increase in pressure within the space defined between the absorber plate 13 and transparent covering means 1 upon heating, can be reduced with the connecting means of this invention since the absorber plate 13 is now expendable downwards.

The results of a calculation of the heat losses, taking into consideration the still possible thermal conductivity over the lower sheet 23, are set forth in the Table, below.

A solar energy collector measuring $1 \times 1.5$ m, has a circumference of 5 m. To simplify, one has to think that the edge is stretched, and one can assume various sheet thicknesses (0.5 and 0.3 mm) as well as different lengths for the lower edge connecting sheet 23; the section in question is the section between the last contact on absorber 13 (point A in FIG. 3) and the contact on the edge (point B in FIG. 3).

The chart is based upon the use of V2A steel (having a thermal conductivity of $\lambda = 21$ [W/mk]) serving as material of the sheet. A temperature difference between points A and B, of 50° and 100° C. have been assumed. The Table clearly illustrates that with appropriate construction parameters, the heat losses via the lower sheet 23 are very small when compared to the incident radiation onto the collector surface 13 of 1.5 $m^2$ (for example 750 W/$m^2$ at half the intensity of the maximum possible radiation). When heating water with such a collector, T is certainly smaller than 50° C. With the lower sheet having a thickness of 0.5 mm and a length of 10 cm, losses are less than 30 W/h.

TABLE

Hourly heat losses $Q_V$ of a collector (1m × 1.5m) to the edge from the absorber via the lower sheet
V2A steel
S = distance between A and B (see FIG. 3)
d = thickness of sheet; T = temperature difference between A and B

| Q [W] | | T = 100° C. | T = 50° C. |
|---|---|---|---|
| d = 0.5 mm | S = 3 cm | 175 | 87.50 |
| | S = 6 cm | 87.5 | 43.8 |
| | S = 10 cm | 52.7 | 26.3 |
| d = 0.3 mm | S = 3 cm | 105 | 52.5 |
| | S = 6 cm | 52.5 | 26.3 |
| | S = 10 cm | 31.7 | 15.8 |

According to a preferred embodiment of the present invention, the absorber sheet 13 can be thickened in the area between its outer edge B and the first fluid channel (in FIG. 3 approx. point A) in order to improve the thermal conductivity thereof. This thickening can be accomplished, for example, by riveting or otherwise adhering another sheet to the already existing sheet, beading the edge, etc. The total thickness of the sheet 13 should be no greater than about 4 mm and preferably between 2 and 3 mm.

Figure 4:
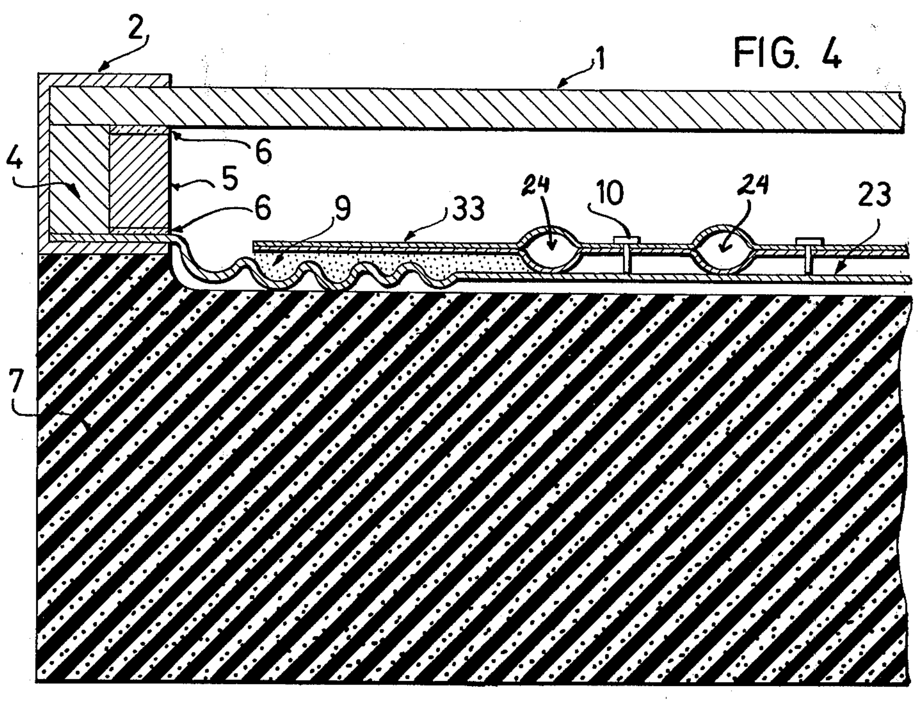
FIG. 4 illustrates another embodiment of the present invention having a different channel or conduit system than that which is illustrated in FIG. 3.

Referring now to FIG. 4, another embodiment of the present invention is illustrated therein. According to this embodiment of the invention, the absorber means consists of absorber plate 33 which is secured by an attachment means 10, e.g., a rivot or screw, to lower sheet 23, which is otherwise identical to sheet 23 illustrated in FIG. 3. The principal difference between this embodiment and the embodiment illustrated in FIG. 3 resides in the positioning of channels or conduits 24 provided on the absorber base and through which the heat transfer medium, e.g., water or a mixture of water and ethylene glycol, flows. Channels or conduits 24, illustrated in FIG. 4, are defined by an upper absorber plate 33 having said channels or conduits passing therethrough, said channels providing a network of parallel flow passages from one end of the absorber plate to the other end. These channels or conduits can be formed by conventional methods known in the art.

The channels or conduits illustrated in FIG. 3, which also provide a network of parallel flow passages for said heat transfer medium are formed by welding or otherwise connecting or adhering a lower sheet or edge connecting sheet 23 to absorber plate 13, said sheet 23 defining at least one channel or conduit passing between said sheet 23 and plate 13.

Referring to both FIGS. 3 and 4, a thermal-insulating material 7 is held against the outer surface of the edge connecting sheet 23 of the absorber means. The thermal-insulating material 7 is recommended to reduce heat loss of the absorber means by convection. The thermal-insulating material 7 can be of the conventionally used materials for this purpose which include, e.g., styrofoam, fiberglass, wood, and asbestos.

Covering means 1 is preferably a cover plate which is selected to pass solar radiation to the absorber plate 13 or 33. Normally, the cover plate is made of glass which may be thermally or chemically strengthened. It is understood that one, two, three, or more cover plates may be used in the practice of this invention.

Reference is now made to the following construction examples illustrating preferred embodiments of the invention.

EXAMPLE I

Flat collector with stainless steel absorber

With reference to FIG. 3, the absorber means is made of two high grade steel sheets 13 and 23, each 0.5 mm thick, which were fitted with the desired channel system for the heat carrier medium to flow therebetween and wherein sheet 23 has the desired wave-like construction according to the invention before the two sheets are put together in a power press. Both sheets are welded together in such a way that the channel system is leakproof. V4A was chosen as the material for the sheets. The absorber means is then glued over an aluminum spacing profile or member 5 with a glue layer 6 located therebetween to the covering means 1. A conventional sealing compound 4 acts as an additional vapor lock and, at the same time, holding the edge protector 2. Foam insulation 7 is installed below the absorber means. The distance of the glass pane 1 from the absorber plate 13 is 20 mm.

Between the lower sheet 23 and the upper sheet 13, along the edge wherein in lower sheet 23 has a wave-like configuration, glass wool is stuffed therein as an insulating material 9.

EXAMPLE II

Flat collector with aluminum rolled band absorber and stainless steel bottom fastened to the absorber With reference to FIG. 4, a commercial aluminum rolled band absorber 33 is connected to a stainless steel bottom sheet 23. Inflow and outflow pipes for the heat transfer medium of the aluminum rolled band absorber are passed through the stainless steel bottom sheet with thumbscrews in order to make this connection gas-tight. The stainless steel bottom sheet 23 is shaped along the edge according to the invention. Glass wool has been stuffed as insulating material 9 between the absorber 33 and bottom sheet 23 between the outermost channel and the edge of said absorber plate 33.

What is claimed is:

1. A gas-tight solar collector unit for converting solar radiation into heat, said solar collector comprising:
- a solar energy and infrared absorber means;
- a cover means transparent to radiant solar energy overlying and in a spaced relation to said absorber means;
- edge structure means for maintaining said absorber means and cover means in spaced relation to provide an airspace located therebetween; and
- said absorber means having means for connecting said absorber means to said edge structure means such that no direct thermal contact exists between the edge of said absorber means and said edge structure means and providing a gas-tight seal for said airspace.

2. The solar energy collector of claim 1, wherein said absorber means further comprises an absorber plate and wherein said connecting means is fastened to the side of the absorber plate opposite to the incident solar radiation.

3. The solar energy collector of claim 2, wherein said connecting means is a sheet having a wave-like shape.

4. The solar energy collector of claim 3, wherein said absorber plate is welded into one unit with said edge connecting sheet below the absorber.

5. The solar energy collector of claim 4, wherein at least said absorber or edge connecting sheet consist of stainless steel.

6. The solar energy collector of claim 5, further comprising a space defined between said absorber plate and said edge connecting sheet, said space being filled with a thermal-insulating material.

7. The solar energy collector of claim 6, wherein said insulating material is glass wool.

8. The solar energy collector of claim 7, wherein said absorber is thickened between its outer edge and a first fluid channel located between said absorber and said sheet in order to improve heat conduction in said thickened area.

9. The solar energy collector of claim 1, wherein said connecting means is a metal.

* * * * *